(12) United States Patent
Wu

(10) Patent No.: US 10,545,352 B2
(45) Date of Patent: Jan. 28, 2020

(54) THREE-DIMENSIONAL DISPLAY DEVICE

(71) Applicant: BOE TECHNOLOGY GROUP CO., LTD., Beijing (CN)

(72) Inventor: Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 15/536,276

(22) PCT Filed: Sep. 6, 2016

(86) PCT No.: PCT/CN2016/098178
§ 371 (c)(1),
(2) Date: Jun. 15, 2017

(87) PCT Pub. No.: WO2017/128722
PCT Pub. Date: Aug. 3, 2017

(65) Prior Publication Data
US 2018/0045971 A1 Feb. 15, 2018

(30) Foreign Application Priority Data
Jan. 26, 2016 (CN) .......................... 2016 1 0053598

(51) Int. Cl.
H04N 13/00 (2018.01)
G02B 27/22 (2018.01)
G02B 5/18 (2006.01)

(52) U.S. Cl.
CPC ............... *G02B 27/22* (2013.01); *G02B 5/18* (2013.01); *G09G 2300/0452* (2013.01)

(58) Field of Classification Search
CPC .... H04N 13/305; H04N 13/324; H04N 13/31; H04N 13/302; H04N 13/317;
(Continued)

(56) References Cited

U.S. PATENT DOCUMENTS 8,848,043 B2 * 9/2014 Lin .................. H04N 13/31
348/54
2006/0262049 A1 11/2006 Kim
(Continued)

FOREIGN PATENT DOCUMENTS

CN      1866337 A    11/2006
CN    101621706 A     1/2010
(Continued)

OTHER PUBLICATIONS

Second Office Action for Chinese Patent Application No. 201610053598.X dated Nov. 10, 2017.
(Continued)

*Primary Examiner* — Alison Slater
(74) *Attorney, Agent, or Firm* — Calfee, Halter & Griswold LLP

(57) ABSTRACT

The present disclosure provides a three-dimensional display device in which a pixel structure includes a plurality of sub-pixels arranged in rows and columns. In each column of sub-pixels, the sub-pixels are aligned. In each row of sub-pixels, each of the sub-pixels is staggered by half a sub-pixel with respect to an adjacent sub-pixel, and is different in color from the adjacent sub-pixel. The corresponding three-dimensional grating includes a plurality of strip-like grating structures periodically arranged in a horizontal direction, wherein the strip-like grating structures extend in the same direction that has a preset inclination angle with respect to the horizontal direction. Each strip-like grating structure corresponds to at least two sub-pixels in respective rows of sub-pixels which display different viewpoint images.

19 Claims, 3 Drawing Sheets

(58) Field of Classification Search
CPC .. G02B 27/2214; G02B 3/005; G02B 6/0016; G02B 6/003; G02F 1/134309
See application file for complete search history.

(56) References Cited

U.S. PATENT DOCUMENTS

| | | | | |
|---|---|---|---|---|
| 2006/0284974 | A1* | 12/2006 | Lipton | H04N 5/72 348/59 |
| 2012/0120005 | A1 | 5/2012 | Kim | |
| 2012/0274630 | A1 | 11/2012 | Lin | |
| 2013/0044143 | A1 | 2/2013 | Hou et al. | |
| 2014/0029094 | A1* | 1/2014 | Kroon | G09G 3/3208 359/463 |
| 2014/0292732 | A1* | 10/2014 | Niioka | G02B 27/22 345/204 |
| 2014/0300714 | A1* | 10/2014 | Muller | H04N 13/31 348/54 |
| 2015/0070476 | A1* | 3/2015 | Wei | H04N 13/31 348/54 |
| 2016/0148551 | A1* | 5/2016 | Jian | G09G 3/003 345/419 |
| 2016/0219260 | A1* | 7/2016 | Sato | H04N 13/0402 |
| 2016/0253943 | A1 | 9/2016 | Wang | |
| 2016/0323566 | A1* | 11/2016 | Vdovin | G02B 27/2214 |
| 2017/0017086 | A1 | 1/2017 | Wei | |
| 2017/0039913 | A1* | 2/2017 | Guo | G09G 3/003 |
| 2017/0069287 | A1 | 3/2017 | Lin et al. | |
| 2017/0085865 | A1* | 3/2017 | Sumi | H04N 13/324 |
| 2017/0176759 | A1 | 6/2017 | Wei | |

FOREIGN PATENT DOCUMENTS

| | | |
|---|---|---|
| CN | 102298238 A | 12/2011 |
| CN | 102809867 A | 12/2012 |
| CN | 103278954 A | 9/2013 |
| CN | 104282727 A | 1/2015 |
| CN | 104570370 A | 4/2015 |
| CN | 104581131 A | 4/2015 |
| CN | 104735440 A | 6/2015 |
| CN | 104965308 A | 10/2015 |
| CN | 105445949 A | 3/2016 |
| CN | 105572886 A | 5/2016 |
| CN | 205318032 U | 6/2016 |
| KR | 20120059953 A | 6/2012 |

OTHER PUBLICATIONS

Search Report for International Patent Application No. PCT/CN2016/098178 dated Dec. 7, 2016.
First Office Action for Chinese Patent Application No. 201610053598.X dated May 26, 2017.
Third Action for Chinese Patent Application No. 201610053598.X dated Mar. 9, 2018.
Notice of Reexamination for Chinese Patent Application No. 201610053598.X dated Jun. 4, 2019.

* cited by examiner

THREE-DIMENSIONAL DISPLAY DEVICE

RELATED APPLICATION

The present application is the U.S. national phase entry of PCT/CN2016/098178, with an international filing date of Sep. 6, 2016, which claims the benefit of Chinese Patent Application No. 201610053598.X, filed on Jan. 26, 2016, the entire disclosure of which is incorporated herein by reference.

FIELD

The present disclosure relates to the field of display technology, and particularly to a three-dimensional display device.

BACKGROUND

At present, a common pixel design for a display screen is an RGB or RGBW design, that is, three or four sub-pixels constitute one pixel for display, the visual resolution of which is the physical resolution. However, as the customer's requirement on feeling of the display screen increases, panel manufacturers need to continually increase the visual resolution (PPI) of the display screen. Currently, the physical resolution of the display screen is generally increased by reducing the pixel size. However, as the pixel size becomes smaller and smaller, the process of manufacturing the display screen will be more and more difficult.

In order to increase the visual resolution of display, a technique of synthesizing two sub-pixels into one pixel has been developed at present, i.e. Pentile technique. The principle of this technique is to perform display by borrowing an adjacent sub-pixel in combination with a corresponding algorithm based on the fact that the resolution of luminance in the human visual system is several times the resolution of chroma (also known as pixel rendering, color dispersion). The Pentile technique can achieve a high resolution using the existing process capability.

At present, with the rapid development of stereoscopic display technology, there is an increasing demand for a three-dimensional display device. In various technologies for realizing the three-dimensional display, the naked eye three-dimensional stereoscopic display is favored since it does not require a viewer to wear glasses. However, when the existing three-dimensional grating designed for a common pixel to realize naked eye stereoscopic display is applied to a pixel structure for realizing virtual display, the crosstalk problem and the Moire problem would be generated, which greatly affect the viewing effect of the three-dimensional display.

SUMMARY

In view of this, embodiments of the present disclosure provide a three-dimensional display device, which can at least partially alleviate or even eliminate the problems in the prior art.

Correspondingly, embodiments of the present disclosure provide a three-dimensional display device comprising a pixel structure having a plurality of sub-pixels arranged in rows and columns, and a three-dimensional grating having a plurality of strip-like grating structures arranged periodically in a horizontal direction. In each column of sub-pixels, the sub-pixels are aligned. In each row of sub-pixels, each of the sub-pixels is staggered by half a sub-pixel with respect to an adjacent sub-pixel and is different in color from the adjacent sub-pixel. The strip-like grating structures extend in the same direction that has a preset inclination angle with respect to the horizontal direction. Each of the strip-like grating structures corresponds to at least two sub-pixels in respective rows of sub-pixels which display different viewpoint images.

According to some embodiments, in the above three-dimensional display device provided by embodiments of the present disclosure, in each column of sub-pixels, every two sub-pixels constitute one square pixel unit, and an aspect ratio of each of the sub-pixels is 1:2. Alternatively, in each column of sub-pixels, every one and a half sub-pixels constitute one square pixel unit, and an aspect ratio of each of the sub-pixels is 2:3. Alternatively, in each column of sub-pixels, one sub-pixel constitutes one square pixel unit, and an aspect ratio of each of the sub-pixels is 1:1.

According to some embodiments, in the above three-dimensional display device provided by embodiments of the present disclosure, in each row of sub-pixels, the sub-pixels in odd-numbered columns are aligned, and the sub-pixels in even-numbered columns are aligned.

According to some embodiments, in the above three-dimensional display device provided by embodiments of the present disclosure, the inclination angle of the direction in which the strip-like grating structure extends with respect to the horizontal direction is [70°, 80°].

According to some embodiments, in the above three-dimensional display device provided by embodiments of the present disclosure, the inclination angle of the direction in which the strip-like grating structure extends with respect to the horizontal direction is [75°, 77.9°].

According to some embodiments, in the above three-dimensional display device provided by embodiments of the present disclosure, the inclination angle of the direction in which the strip-like grating structure extends with respect to the horizontal direction is 76°, 77°, 78° or 76.89°.

According to some embodiments, in the above three-dimensional display device provided by embodiments of the present disclosure, each of the strip-like grating structures corresponds to three sub-pixels in respective rows of sub-pixels which display two viewpoint images respectively.

According to some embodiments, in the above three-dimensional display device provided by embodiments of the present disclosure, a viewpoint image displayed by each of the sub-pixels in the pixel structure takes every three columns of sub-pixels as a repeating unit or takes every six columns of sub-pixels as a repeating unit.

According to some embodiments, in the above three-dimensional display device provided by embodiments of the present disclosure, in each column of sub-pixels, a display luminance of either or both of two adjacent sub-pixels that display different viewpoint images is lower than a display luminance of other sub-pixels.

According to some embodiments, in the above three-dimensional display device provided by embodiments of the present disclosure, in each column of sub-pixels, the display luminance of either or both of two adjacent sub-pixels that display different viewpoint images is 0° 4-80% of the display luminance of other sub-pixels. Particularly, in each column of sub-pixels, the display luminance of either or both of two adjacent sub-pixels that display different viewpoint images is 50% of the display luminance of other sub-pixels.

According to some embodiments, in the above three-dimensional display device provided by embodiments of the present disclosure, the three-dimensional grating is a lens grating, and the strip-like grating structure is a lens structure.

Alternatively, the three-dimensional grating is a slit grating, and the strip-like grating structure is a combination of a strip-like light-transmitting region and a strip-like light-shielding region.

According to some embodiments, in the above three-dimensional display device provided by embodiments of the present disclosure, when the strip-like grating structure is a combination of a strip-like light-transmitting region and a strip-like light-shielding region, the strip-like light-transmitting region and the strip-like light-shielding region extend in a same direction as the strip-like grating structure extends.

According to some embodiments, in the above three-dimensional display device provided by embodiments of the present disclosure, the three-dimensional grating is arranged on a light exit side of the pixel structure. Alternatively, the three-dimensional grating is arranged on a light incidence side of the pixel structure when the pixel structure is a liquid crystal pixel structure.

In the three-dimensional display device provided by embodiments of the present disclosure, the pixel structure includes a plurality of sub-pixels arranged in rows and columns. In each column of sub-pixels, the sub-pixels are aligned. In each row of sub-pixels, each of the sub-pixels is staggered by half a sub-pixel with respect to an adjacent sub-pixel, and is different in color from the adjacent sub-pixel. A corresponding three-dimensional grating includes a plurality of strip-like grating structures periodically arranged in a horizontal direction, wherein respective strip-like grating structures extend in the same direction that has a preset inclination angle with respect to the horizontal direction. Each strip-like grating structure corresponds to at least two sub-pixels in respective rows of sub-pixels which display different viewpoint images. By using the inclined strip-like grating structure in cooperation with the pixel structure in which each of the sub-pixels is staggered by half a sub-pixel with respect to an adjacent sub-pixel in each row of sub-pixels, the proportion of the sub-pixels which are simultaneously covered by two adjacent strip-like gating structures can be reduced, thereby reducing the crosstalk and Moire upon three-dimensional display, and improving the viewing effect of three-dimensional display.

DETAILED DESCRIPTION

Specific implementations of the three-dimensional display device provided by embodiments of the present disclosure will be described in detail below with reference to the accompanying drawings.

Figure 1:
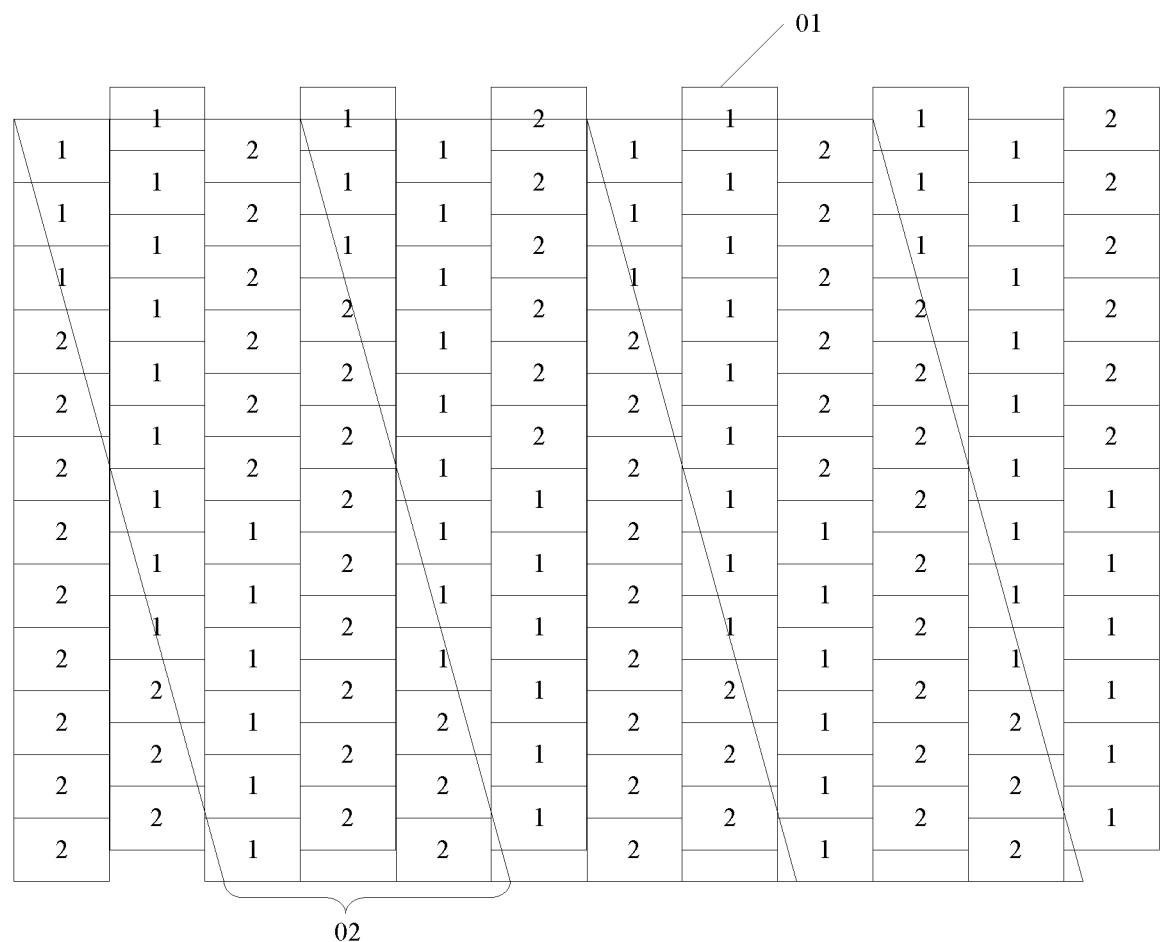
FIG. 1 is a schematic structural view of a three-dimensional display device provided by embodiments of the present disclosure.

A three-dimensional display device provided by embodiments of the present disclosure comprises, as shown in FIG. 1, a pixel structure comprising a plurality of sub-pixels 01 arranged in rows and columns, and a three-dimensional grating comprising a plurality of strip-like grating structures 02 arranged periodically in a horizontal direction.

Figure 2A:
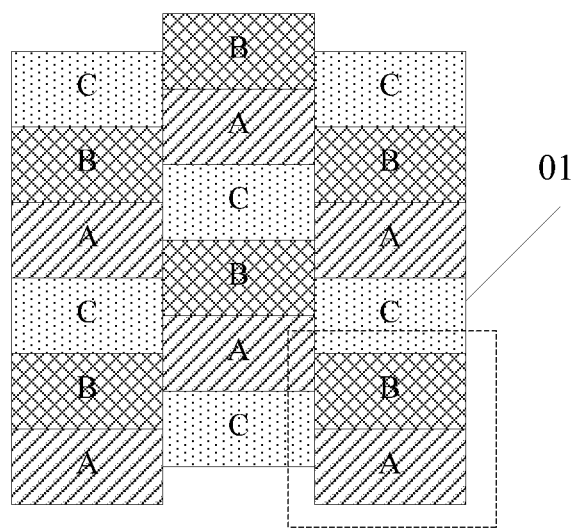
FIGS. 2a-2c are schematic structural views of the pixel structure in a three-dimensional display device provided by embodiments of the present disclosure.
Figure 2B:
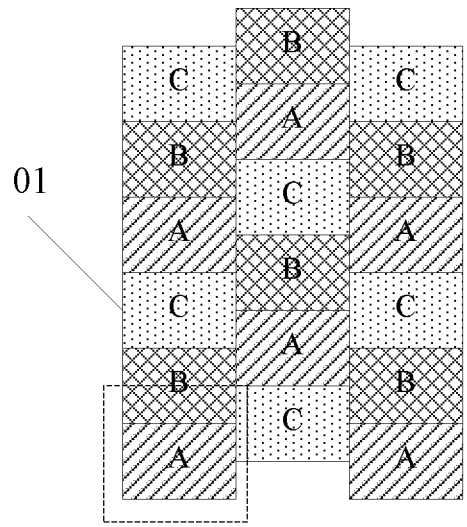
Figure 2C:
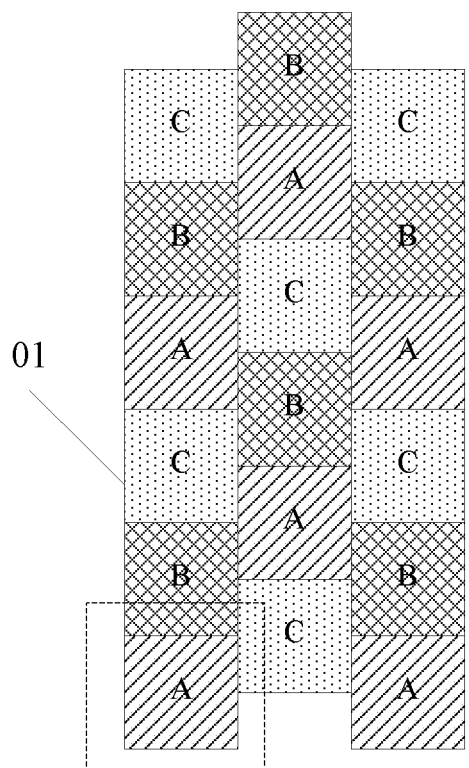

Specifically, as shown in FIGS. 2a-2c, in each column of sub-pixels, the sub-pixels 01 are aligned. In each row of sub-pixels, each of the sub-pixels 01 is staggered by half a sub-pixel with respect to an adjacent sub-pixel 01, and is different in color from the adjacent sub-pixel 01. In FIGS. 2a-2c, three different colors are denoted by A, B and C, respectively.

Referring to FIG. 1, the strip-like grating structures 02 extend in the same direction that has a preset inclination angle with respect to the horizontal direction. Each of the strip-like grating structures 02 corresponds to at least two sub-pixels 01 in respective rows of sub-pixels which display different viewpoint images.

In the above-described three-dimensional display device provided by embodiments of the present disclosure, by using the inclined strip-like grating structure 02 in cooperation with the pixel structure in which each of the sub-pixels 01 is staggered by half a sub-pixel with respect to the adjacent sub-pixel 01 in each row of sub-pixels, the proportion of the sub-pixels which are simultaneously covered by two adjacent strip-like gating structures can be reduced, thereby reducing the crosstalk and Moire upon three-dimensional display, and improving the viewing effect of three-dimensional display.

Further, in the pixel structure of the above-described three-dimensional display device provided by embodiments of the present disclosure, as shown in FIGS. 2a to 2c, in each row of sub-pixels, the sub-pixels 01 in the odd-numbered columns are aligned, and the sub-pixels pixels 01 in the even-numbered columns are aligned so as to ensure that the pixel structure is a rectangular structure as a whole. In addition, the pixel structure of the above-described three-dimensional display device provided by embodiments of the present disclosure is particularly applicable to a vertical screen device such as a mobile phone which has a length greater than a width when it is rotated by 90 degrees to display a three-dimensional image in a landscape mode.

According to embodiments of the present disclosure, in the pixel structure of the above-described three-dimensional display device provided by embodiments of the present disclosure, a virtual pixel structure design may be employed, in which at most two adjacent sub-pixels 01 constitute one square pixel unit, which then achieves virtual display in cooperation with a virtual algorithm upon display. This allows the sub-pixel 01 to be selectively turned on and the same information is displayed with fewer pixels without reducing the pixel size, thereby increasing the output resolution of the displayed image. Specifically, it can be that, as shown in FIG. 2a, in each column of sub-pixels 01, every two sub-pixels 01 constitute one square pixel unit (shown by the dashed box), and the aspect ratio of each sub-pixel 01 is 1:2. It also can be that, as shown in FIG. 2b, in each column of sub-pixels 01, every one and a half sub-pixels 01 constitute one square pixel unit (shown by the dashed box), and the aspect ratio of each sub-pixel 01 is 2:3. It also can be that, as shown in FIG. 2c, in each column of sub-pixels 01, one sub-pixel 01 constitutes one square pixel unit (shown by the dashed box), and the aspect ratio of each sub-pixel 01 is 1:1. The description below is based on the example that the aspect ratio of each sub-pixel 01 shown in FIG. 2b is 2:3.

According to embodiments of the present disclosure, in the above-described three-dimensional display device provided by embodiments of the present disclosure, when the inclination angle of the direction in which the strip-like grating structure 02 extends with respect to the horizontal direction is in the range of [70°, 80°], a better effect of reducing the Moire can be achieved. Further, the inclination angle of the direction in which the strip-like grating structure 02 extends with respect to the horizontal direction is in the range of [75°, 77.9°]. For example, the inclination angle of the direction in which the strip-like grating structure 02 extends with respect to the horizontal direction is 76°, 77°, 78° or 76.89°. Furthermore, at the time of designing the respective strip-like grating structures 02 in the three-dimensional grating, they may incline rightward as shown in FIG. 1, or incline leftward, which is not limited here. The description below is all based on the example that the strip-like grating structures 02 incline rightward.

According to embodiments of the present disclosure, in the three-dimensional grating of the above-described three-dimensional display device provided by embodiments of the present disclosure, a side edge of each of the strip-like grating structures 02 is an oblique line extending along the direction in which the strip-like grating structure 02 extends, and the oblique line divides each of the sub-pixels 01 overlapping the edge into two portions. At that time, each of the divided sub-pixels 01 is theoretically corresponding to the strip-like grating structure 02 which overlaps the portion that occupies a larger proportion. For example, if the sub-pixel 01 is divided into two portions of a and b, and the proportion of the portion a is larger than that of the portion b, the sub-pixel 01 corresponds to the strip-like grating structure 02 which overlaps the portion a and belongs to the viewpoint image of the strip-like grating structure 02.

In the case where the low crosstalk and the low Moire are considered in combination, as shown in FIG. 1, each of the strip-like grating structures 02 simultaneously has lower three-dimensional crosstalk and less Moire when it corresponds to three sub-pixels 01 in respective rows of sub-pixels which display two viewpoint images respectively. In FIG. 1, two viewpoint images are denoted by 1 and 2, respectively. In general, in one column of sub-pixels, the viewpoint images displayed by the respective sub-pixels 01 are arranged sequentially. The arrangement order of the viewpoint images of each column of sub-pixels 01 depends on the inclination angle of the strip-like grating structure 02. In general, the viewpoint image displayed by each of the sub-pixels 01 in the pixel structure takes every three columns of sub-pixels as a repeating unit or every six columns of sub-pixels as a repeating unit.

Specifically, when the inclination angle of the direction in which the strip-like grating structure 02 extends with respect to the horizontal direction is 76°, the viewpoint image displayed by each of the sub-pixels in the pixel structure takes every three columns of sub-pixels as a repeating unit, and the repeating unit is specifically shown in Table 1.

TABLE 1

| first column | viewpoint image | second column | viewpoint image | third column | viewpoint image |
|---|---|---|---|---|---|
| three rows | 1 | nine rows | 1 | six rows | 2 |
| nine rows | 2 | nine rows | 2 | nine rows | 1 |
| nine rows | 1 | nine rows | 1 | nine rows | 2 |
| nine rows | 2 | nine rows | 2 | nine rows | 1 |
| nine rows | 1 | nine rows | 1 | nine rows | 2 |
| subsequently displaying the viewpoint images 1 and 2 alternately takinge every nine rows as a cycle | | | | | |

According to Table 1, the repeating unit may employ a sub-pixel located at the upper left (right) corner in the pixel structure as a starting point. In the first column at the corresponding upper left corner, the sub-pixels of the first to third rows display the first view, the sub-pixels of the fourth to twelfth rows display the second view, and the sub-pixels of the thirteenth to twenty-first rows display the first view, i.e. the sub-pixels of the first three rows display the first view, the sub-pixels of the next nine rows display the second view, the sub-pixels of the next nine rows display the first view, the sub-pixels of the next nine rows display the second view, and the sub-pixels of the next nine rows display the first view, and so on until the end of this column.

In the second column at the corresponding upper left corner, the sub-pixels of the first to ninth rows display the first view, the sub-pixels of the tenth to eighteenth rows display the second view, and the sub-pixels of the nineteenth to twenty-seventh rows display the first view, i.e. the sub-pixels of the first nine rows display the first view, the sub-pixels of the next nine rows display the second view, the sub-pixels of the next nine rows display the first view, the sub-pixels of the next nine rows display the second view, and the sub-pixels of the next nine rows display the first view, and so on until the end of this column.

In the third column at the corresponding upper left corner, the sub-pixels of the first to sixth rows display the second view, the sub-pixels of the seventh to fifteenth rows display the first view, and the sub-pixels of the sixteenth to twenty-fourth rows display the second view, i.e. the sub-pixels of the first six rows display the second view, the sub-pixels of the next nine rows display the first view, the sub-pixels of the next nine rows display the second view, the sub-pixels of the next nine rows display the first view, and the sub-pixels of the next nine rows display the second view, and so on until the end of this column.

The sub-pixels of each subsequent column take the above three columns of sub-pixels as a repeating unit, which are arranged in this manner.

Specifically, when the inclination angle of the direction in which the strip-like grating structure 02 extends with respect to the horizontal direction is 77°, the viewpoint image displayed by each of the sub-pixels in the pixel structure takes every three columns of sub-pixels as a repeating unit, and the repeating unit is specifically shown in Table 2.

TABLE 2

| first column | viewpoint image | second column | viewpoint image | third column | viewpoint image |
|---|---|---|---|---|---|
| three rows | 1 | nine rows | 1 | six rows | 2 |
| ten rows | 2 | ten rows | 2 | ten rows | 1 |
| ten rows | 1 | ten rows | 1 | ten rows | 2 |
| ten rows | 2 | ten rows | 2 | ten rows | 1 |
| ten rows | 1 | ten rows | 1 | ten rows | 2 |
| subsequently displaying the viewpoint images 1 and 2 alternately taking every ten rows as a cycle | | | | | |

Specifically, when the inclination angle of the direction in which the strip-like grating structure 02 extends with respect to the horizontal direction is 78°, the viewpoint image displayed by each of the sub-pixels in the pixel structure takes every three columns of sub-pixels as a repeating unit, and the repeating unit is specifically shown in Table 3.

TABLE 3

| first column | view-point image | second column | view-point image | third column | view-point image |
|---|---|---|---|---|---|
| three rows | 1 | ten rows | 1 | six rows | 2 |
| eleven rows | 2 | eleven rows | 2 | eleven rows | 1 |
| eleven rows | 1 | eleven rows | 1 | eleven rows | 2 |

TABLE 3-continued

| first column | viewpoint image | second column | viewpoint image | third column | viewpoint image |
|---|---|---|---|---|---|
| eleven rows | 2 | eleven rows | 2 | eleven rows | 1 |
| eleven rows | 1 | eleven rows | 1 | eleven rows | 2 |
| subsequently displaying the viewpoint images 1 and 2 alternately taking every eleven rows as a cycle | | | | | |

Specifically, when the inclination angle of the direction in which the strip-like grating structure 02 extends with respect to the horizontal direction is 76.89°, the viewpoint image displayed by each of the sub-pixels in the pixel structure takes every six columns of sub-pixels as a repeating unit, and the repeating unit is specifically shown in Table 4.

TABLE 4

| first column | viewpoint image | second column | viewpoint image | third column | viewpoint image | fourth column | viewpoint image | fifth column | viewpoint image | sixth column | viewpoint image |
|---|---|---|---|---|---|---|---|---|---|---|---|
| three rows | 1 | ten rows | 1 | six rows | 2 | three rows | 1 | nine rows | 1 | seven rows | 2 |
| nine rows | 2 | nine rows | 2 | ten rows | 1 | ten rows | 2 | ten rows | 2 | nine rows | 1 |
| ten rows | 1 | ten rows | 1 | nine rows | 2 | nine rows | 1 | nine rows | 1 | ten rows | 2 |
| nine rows | 2 | nine rows | 2 | ten rows | 1 | ten rows | 2 | ten rows | 2 | nine rows | 1 |
| ten rows | 1 | ten rows | 1 | nine rows | 2 | nine rows | 1 | nine rows | 1 | ten rows | 2 |
| subsequently displaying the viewpoint image 2 in nine rows and displaying the viewpoint image 1 in ten rows, alternately | | | | | | subsequently displaying the viewpoint image 1 in nine rows and displaying the viewpoint image 2 in ten rows, alternately | | | | | |

Figure 3:
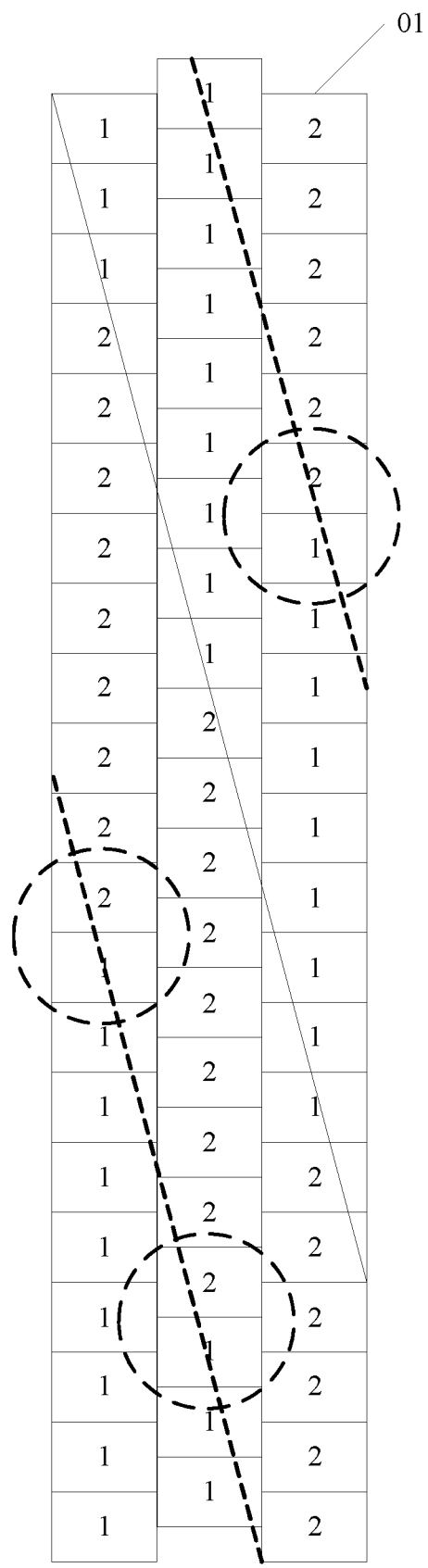
FIG. 3 is a partial schematic structural view of a three-dimensional display device provided by embodiments of the present disclosure.

Further, in the pixel structure in the above-described three-dimensional display device provided by embodiments of the present disclosure, in each column of sub-pixels, the display luminance of either or both of two adjacent sub-pixels that display different viewpoint images may be set to be lower than the display luminance of other sub-pixels. For example, for two adjacent sub-pixels in each column which display the viewpoint image 1 and the viewpoint image 2, respectively, either or both of them display at low luminance which is 0% to 80%, particularly 50% of the luminance upon normal display. As shown in FIG. 3, since the two sub-pixels (indicated by dashed circles) are exactly in the middle area of iii each strip-like grating structure (the dashed line in the figure is the center line of the strip-like grating structure), i.e. the two sub-pixels are across the left and right portions of the strip-like grating structure and are points that increase the crosstalk, reducing the display luminance thereof can significantly reduce the three-dimensional crosstalk, thereby improving the three-dimensional display effect.

According to embodiments of the present disclosure, the three-dimensional grating in the above-described three-dimensional display device provided by embodiments of the present disclosure may specifically be a lens grating, and correspondingly, each of the strip-like grating structures 02 constituting the three-dimensional grating is a lens structure. A liquid crystal lens can be used to achieve the function of the lens thereof. Alternatively, the three-dimensional grating in the above-described three-dimensional display device provided by embodiments of the present disclosure may specifically be a slit grating, and correspondingly, each of the strip-like grating structures 02 constituting the three-dimensional grating is a combination of a strip-like light-transmitting region and a strip-like light-shielding region, i.e. one strip-like grating structure 02 includes a strip-like light-transmitting region and a strip-like light-shielding region, and the strip-like light-transmitting region and the strip-like light-shielding region extend in the same direction as the strip-like grating structure 02 extends.

According to embodiments of the present disclosure, the positional relationship between the three-dimensional grating and the pixel structure in the above-described three-dimensional display device provided by embodiments of the present disclosure is that the three-dimensional grating may be arranged on a light exit side of the pixel structure; or when the pixel structure is a liquid crystal pixel structure, the three-dimensional grating may also be arranged on a light incidence side of the pixel structure.

In the three-dimensional display device provided by embodiments of the present disclosure, the pixel structure includes a plurality of sub-pixels iii arranged in rows and columns. In each column of sub-pixels, the sub-pixels are aligned. In each row of sub-pixels, each of the sub-pixels is staggered by half a sub-pixel with respect to an adjacent sub-pixel, and is different in color from the adjacent sub-pixel. The corresponding three-dimensional grating includes a plurality of strip-like grating structures periodically arranged in a horizontal direction, wherein the strip-like grating structures extend in the same direction that has a preset inclination angle with respect to the horizontal direction. Each strip-like grating structure corresponds to at least two sub-pixels in respective rows of sub-pixels which display different viewpoint images. By using the inclined strip-like grating structure in cooperation with the pixel structure in which each of the sub-pixels is staggered by half a sub-pixel with respect to an adjacent sub-pixel in each row of sub-pixels, the proportion of the sub-pixels which are simultaneously covered by two adjacent strip-like gating structures can be reduced, thereby reducing the crosstalk and Moire upon three-dimensional display, and improving the viewing effect of three-dimensional display.

Apparently, those skilled in the art can make various modifications and variations to the present disclosure without departing from the spirit and scope thereof. In this way, if these modifications and variations to the present disclosure fall within the scope of the claims of the present disclosure and equivalent technologies thereof, the present disclosure also intends to encompass these modifications and variations.

The invention claimed is:

1. A three-dimensional display device comprising: a pixel structure having a plurality of rectangular sub-pixels arranged in rows and columns, and a three-dimensional grating having a plurality of strip-like grating structures, wherein,
   in each column of the sub-pixels, the sub-pixels are aligned;
   in each row of the sub-pixels, each of the sub-pixels is staggered by half a sub-pixel with respect to an adjacent sub-pixel and is different in color from the adjacent sub-pixel;

each of the plurality of strip-like grating structures is tilted relative to a horizontal direction parallel to long sides of the plurality of rectangular sub-pixels, the plurality of the strip-like grating structures extend in a same direction that has a preset inclination angle with respect to the horizontal direction; and each of the strip-like grating structures corresponds to at least two sub-pixels in respective rows of sub-pixels which display different viewpoint images, wherein the preset inclination angle of the direction in which the strip-like grating structure extends with respect to the horizontal direction is in a range of 70° to 80°.

2. The three-dimensional display device according to claim 1, wherein in each column of the sub-pixels, every two sub-pixels constitute one square pixel unit, and an aspect ratio of each of the sub-pixels is 1:2.

3. The three-dimensional display device according to claim 1, wherein in each row of the sub-pixels, the sub-pixels in odd-numbered columns are aligned, and the sub-pixels in even-numbered columns are aligned.

4. The three-dimensional display device according to claim 1, wherein the preset inclination angle of the direction in which the strip-like grating structure extends with respect to the horizontal direction is in a range of 75° to 77.9°.

5. The three-dimensional display device according to claim 4, wherein the preset inclination angle of the direction in which the strip-like grating structure extends with respect to the horizontal direction is selected from the group consisting of 76°, 77°, 78° and 76.89°.

6. The three-dimensional display device according to claim 1, wherein each of the strip-like grating structures corresponds to three sub-pixels in respective rows of sub-pixels which display two viewpoint images respectively.

7. The three-dimensional display device according to claim 6, wherein a viewpoint image displayed by each of the sub-pixels in the pixel structure takes every three columns of sub-pixels as a repeating unit.

8. The three-dimensional display device according to claim 6, wherein in each column of the sub-pixels, a display luminance of either or both of two adjacent sub-pixels that display different viewpoint images is lower than a display luminance of other sub-pixels.

9. The three-dimensional display device according to claim 8, wherein in each column of the sub-pixels, the display luminance of either or both of two adjacent sub-pixels that display different viewpoint images is 0%-80% of the display luminance of other sub-pixels.

10. The three-dimensional display device according to claim 9, wherein in each column of the sub-pixels, the display luminance of either or both of two adjacent sub-pixels that display different viewpoint images is 50% of the display luminance of other sub-pixels.

11. The three-dimensional display device according to claim 1, wherein the three-dimensional grating is a slit grating, and the strip-like grating structure is a combination of a strip-like light-transmitting region and a strip-like light-shielding region.

12. The three-dimensional display device according to claim 11, wherein the strip-like light-transmitting region and the strip-like light-shielding region extend in a same direction as the strip-like grating structure extends.

13. The three-dimensional display device according to claim 11, wherein the three-dimensional grating is arranged on a light exit side of the pixel structure.

14. The three-dimensional display device according to claim 1, wherein in each column of the sub-pixels, every one and a half sub-pixels constitute one square pixel unit, and an aspect ratio of each of the sub-pixels is 2:3.

15. The three-dimensional display device according to claim 1, wherein in each column of the sub-pixels, one sub-pixel constitutes one square pixel unit, and an aspect ratio of each of the sub-pixels is 1:1.

16. The three-dimensional display device according to claim 6, wherein a viewpoint image displayed by each of the sub-pixels in the pixel structure takes every six columns of sub-pixels as a repeating unit.

17. The three-dimensional display device according to claim 1, wherein the three-dimensional grating is a lens grating, and the strip-like grating structure is a lens structure.

18. The three-dimensional display device according to claim 11, wherein the three-dimensional grating is arranged on a light incidence side of the pixel structure when the pixel structure is a liquid crystal pixel structure.

19. The three-dimensional display device according to claim 2, wherein the three-dimensional grating is a slit grating, and the strip-like grating structure is a combination of a strip-like light-transmitting region and a strip-like light-shielding region.

* * * * *